(12) United States Patent
Won

(10) Patent No.: US 8,714,238 B2
(45) Date of Patent: May 6, 2014

(54) HEAT EXCHANGER

(75) Inventor: Jong-Seung Won, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 401 days.

(21) Appl. No.: 12/862,459

(22) Filed: Aug. 24, 2010

(65) Prior Publication Data

US 2011/0108254 A1   May 12, 2011

(30) Foreign Application Priority Data

Nov. 11, 2009   (KR) .................. 10-2009-0108609

(51) Int. Cl.
  *F01N 5/02*   (2006.01)
  *F02M 31/08*   (2006.01)
  *F28F 27/02*   (2006.01)

(52) U.S. Cl.
  USPC ............... 165/103; 165/51; 165/52; 165/102

(58) Field of Classification Search
  USPC ............. 165/52, 103, 158, 173, 183, 51, 102; 60/320
  See application file for complete search history.

(56) References Cited

U.S. PATENT DOCUMENTS

| | | | |
|---|---|---|---|
| 4,671,060 A | 6/1987 | Wilkens | |
| 4,802,530 A * | 2/1989 | Goldstein | 165/94 |
| 6,871,489 B2 | 3/2005 | Tumati et al. | |
| 2009/0038302 A1* | 2/2009 | Yamada et al. | 60/320 |
| 2009/0151342 A1* | 6/2009 | Major | 60/320 |
| 2010/0038062 A1* | 2/2010 | Cros | 165/158 |

FOREIGN PATENT DOCUMENTS

| | | |
|---|---|---|
| DE | 4431 135 A1 | 3/1996 |
| FR | 2887618 A1 * | 12/2006 |
| JP | 2-108807 A | 4/1990 |

(Continued)

OTHER PUBLICATIONS

FR 2887618 A1 claims translation, 1-3.*

(Continued)

*Primary Examiner* — Brandon M Rosati
*Assistant Examiner* — Jon T Schermerhorn
(74) *Attorney, Agent, or Firm* — Morgan, Lewis & Bockius LLP

(57) ABSTRACT

A heat exchanger collects exhaust heat of high temperature so as to warm up an engine and to heat a cabin and a battery and reduces noise of an exhaust gas. The heat exchanger may include a case provided with an exhaust inlet at one side and an exhaust outlet at the other side, an exhaust gas flowing in through the exhaust inlet and flowing out through the exhaust outlet, a coolant pathway formed in the case and fluidly communicating with a coolant inlet and a coolant outlet so as to pass coolant, an exhaust pathway formed in a pipe shape, disposed close to the coolant pathway in the case, and provided with one end connected to the exhaust inlet and the other end connected to the exhaust outlet so as to pass the exhaust gas, a bypass pathway formed in a pipe shape, disposed at a middle portion of the exhaust pathway along a length direction thereof, provided with one end selectively connected to the exhaust inlet through a valve and the other end always connected to the exhaust outlet so as to pass the exhaust gas selectively, and a connecting pipe radially extending from an exterior circumference of the bypass pathway to the exhaust pathway so as to send a portion of the exhaust gas passing through the bypass pathway to the exhaust pathway.

11 Claims, 2 Drawing Sheets

(56) References Cited

FOREIGN PATENT DOCUMENTS

| | | |
|---|---|---|
| JP | 2004-169594 A | 6/2004 |
| JP | 2004-197664 A | 7/2004 |
| JP | 2007-247554 A | 9/2007 |
| JP | 2009-74552 A | 4/2009 |
| KR | 2001-0102171 A | 11/2001 |
| KR | 2002-0050654 A | 6/2002 |
| KR | 10-0391297 B1 | 7/2003 |
| KR | 10-2009-0063492 A | 6/2009 |
| KR | 10-2009-0063493 A | 6/2009 |

OTHER PUBLICATIONS

FR 2887618 A1 description translation, 1-12.*

* cited by examiner

HEAT EXCHANGER

CROSS-REFERENCE TO RELATED APPLICATION

This application claims priority to and the benefit of Korean Patent Application No. 10-2009-0108609 filed in the Korean Intellectual Property Office on Nov. 11, 2009, the entire contents of which are incorporated herein for all purposes by this reference.

BACKGROUND OF THE INVENTION

1. Field of the Invention

The present invention relates to a heat exchanger. More particularly, the present invention relates to a heat exchanger which collects exhaust heat of high temperature so as to warm up an engine and to heat a cabin and a battery and reduces noise of an exhaust gas.

2. Description of the Related Art

Generally, a heat exchanger makes an exhaust gas exchange heat with a coolant so as to lower temperature of the exhaust gas of high temperature and to raise temperature of the coolant of low temperature. The coolant heated by such a heat exchanger is used for warming up an engine quickly (fast warm-up) when temperature of the engine is low or heating a cabin or a battery.

A conventional heat exchanger includes an exhaust pathway though which the exhaust gas passes, a coolant pathway through which the coolant passes, and a bypass pathway bypassing the exhaust gas according to an operating condition of the engine. In a case that the engine operates with low speed, the exhaust gas passes through the exhaust pathway. On the contrary, in a case that the engine operates with high speed, the exhaust gas passes through the bypass pathway. The bypass pathway is disposed closer to the coolant pathway than the exhaust pathway. Therefore, the exhaust gas of high temperature is cooled by the coolant when passing through the bypass pathway, and the exhaust gas of low temperature is cooled by the coolant when passing through the exhaust pathway.

In order to install a conventional heat exchanger to a vehicle, an auxiliary muffler disposed at a lower end of a center floor in the vehicle should be removed. A conventional heat exchanger should be mounted at a position where the auxiliary muffler was mounted. As the auxiliary muffler is removed, noise of the exhaust gas may increase. Since the noise of the exhaust gas increases, inner noise and outer noise also increase and it may hard to meet noise regulations.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a heat exchanger having advantages of being used simultaneously as a muffler and a heat exchanger.

An aspect of the present invention is to provide a heat exchanger having function of a muffler without increase of volume.

A heat exchanger according to various embodiments of the present invention may include a case provided with an exhaust inlet at one side and an exhaust outlet at the other side, an exhaust gas flowing in through the exhaust inlet and flowing out through the exhaust outlet, a coolant pathway formed in the case and fluidly communicating with a coolant inlet and a coolant outlet so as to pass coolant, an exhaust pathway formed in a pipe shape, disposed close to the coolant pathway in the case, and provided with one end connected to the exhaust inlet and the other end connected to the exhaust outlet so as to pass the exhaust gas, a bypass pathway formed in a pipe shape, disposed at a middle portion of the exhaust pathway along a length direction thereof, provided with one end selectively connected to the exhaust inlet through a valve and the other end always connected to the exhaust outlet so as to pass the exhaust gas selectively, and a connecting pipe radially extending from an exterior circumference of the bypass pathway to the exhaust pathway so as to send a portion of the exhaust gas passing through the bypass pathway to the exhaust pathway.

The valve may be selectively open or closed according to an operating condition of an engine.

That is, the valve may be open in a case that the engine operates with high speed and the valve may be closed in a case that the engine operates with low speed.

The coolant pathway may include a first coolant pathway disposed between the case and the exhaust pathway and making the coolant exchange heat with the exhaust gas passing through the exhaust pathway, and a second coolant pathway disposed between the exhaust pathway and the bypass pathway and making the coolant exchange heat with the exhaust gas passing through the exhaust pathway and the bypass pathway.

The connecting pipe may penetrate the second coolant pathway and communicate the bypass pathway with the exhaust pathway.

An air gap may be formed between the bypass pathway and the second coolant pathway.

An exterior circumference of the exhaust pathway and an exterior circumference of the second coolant pathway may be corrugated along a circumferential direction thereof so as to increase heat exchanging area.

A heat exchanger according to various other exemplary embodiments of the present invention may include a case provided with an exhaust inlet at one side and an exhaust outlet at the other side, an exhaust gas flowing in through the exhaust inlet and flowing out through the exhaust outlet, a first coolant pathway formed at an interior circumference of the case and fluidly communicating with a coolant inlet and a coolant outlet so as to pass coolant, an exhaust pathway formed in a pipe shape, inserted in the first coolant pathway, and provided with one end connected to the exhaust inlet and the other end connected to the exhaust outlet so as to pass the exhaust gas, a second coolant pathway formed in a pipe shape, inserted in the exhaust pathway, and communicating with the first coolant pathway so as to pass the coolant, a bypass pathway formed in a pipe shape, inserted in the second coolant pathway, and provided with one end selectively connected to the exhaust inlet through a valve and the other end always connected to the exhaust outlet so as to pass the exhaust gas selectively, and a connecting pipe communicating the bypass pathway with the exhaust pathway.

Volume of the exhaust pathway may be larger than that of the bypass pathway.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
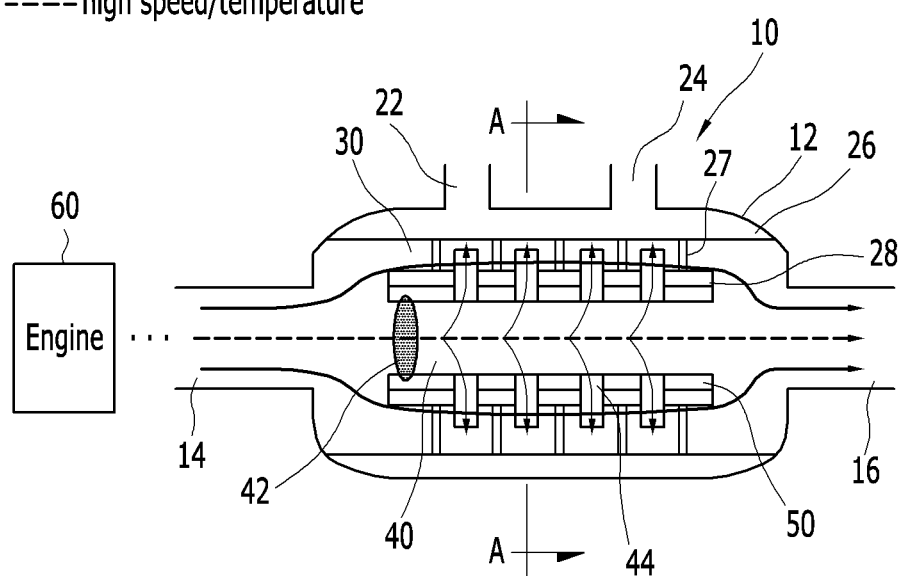
FIG. 1 is a cross-sectional view of a heat exchanger according to an exemplary embodiment of the present invention.
Figure 2:
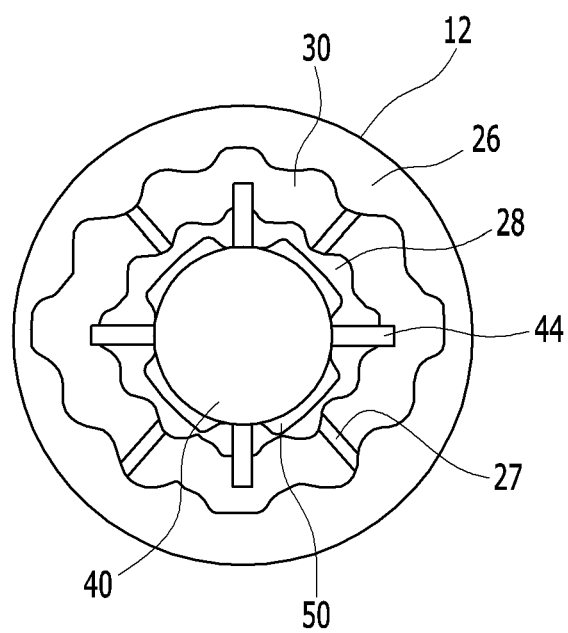
FIG. 2 is a cross-sectional view taken along A-A line in FIG. 1.

As shown in FIG. 1 and FIG. 2, a heat exchanger 10 according to various embodiments of the present invention includes a first coolant pathway 26, an exhaust pathway 30, a second coolant pathway 28, and a bypass pathway 40 sequentially disposed in a case 12 from an interior circumference to a center of the case 12.

The exhaust pathway 30, the second coolant pathway 28, and the bypass pathway 40 have pipe shapes, respectively.

The case 12 is made of metal or plastic material and has a space in which the first and second coolant pathways 26 and 28, the exhaust pathway 30, and the bypass pathway 40 are mounted. The case 12 is provided with an exhaust inlet 14 at one end such that an exhaust gas generated in an engine 60 flows in the case 12 therethrough. The exhaust gas flowing in the heat exchanger 10 exchanges heat with the coolant and is cooled down in the case 12. The case 12 is provided with an exhaust outlet 16 at the other end such that the exhaust gas passing through the heat exchanger 10 is flowed out.

The first coolant pathway 26 is formed at an interior circumference of the case 12. The first coolant pathway 26 is connected to the coolant inlet 22 so as to receive the coolant and is connected to the coolant outlet 24 so as to flow out the coolant heat exchanging with the exhaust gas.

The exhaust pathway 30 is inserted in the first coolant pathway 26 but is not communicating with the first coolant pathway 26. Therefore, the exhaust gas passing through the exhaust pathway 30 is not contacted with the coolant passing through the first coolant pathway 26. However, the exhaust gas exchanges heat with the coolant through an exterior circumference of the exhaust pathway 30. One end of the exhaust pathway 30 is connected to the exhaust inlet 14 and the other end of the exhaust pathway 30 is connected to the exhaust outlet 16. Therefore, the exhaust gas flowing in the case 12 through the exhaust inlet 14 exchanges heat with the coolant when passing through the exhaust pathway 30. After that, the exhaust gas is flowed out through the exhaust outlet 16. In order to increase heat exchanging area between the exhaust gas passing through the exhaust pathway 30 and the coolant passing through the first coolant pathway 26, the exterior circumference of the exhaust pathway 30 is wrinkled or corrugated along a circumferential direction thereof.

The second coolant pathway 28 is inserted in the exhaust pathway 30. The second coolant pathway 28 is communicating with the first coolant pathway 26 through a coolant connecting pipe 27 but is not fluidly communicating with the exhaust pathway 30. Therefore, a portion of the coolant passing through the first coolant pathway 26 is flowed in the second coolant pathway 28 through the coolant connecting pipe 27. The portion of the coolant exchanges heat with the exhaust gas at the second coolant pathway 28 and is then flowed to the first coolant pathway 26 through the coolant connecting pipe 27. The second coolant pathway 28 cools the exhaust gas passing though the exhaust pathway 30 and the bypass pathway 40. In order to increase heat exchanging area between the exhaust gas and the coolant, an exterior circumference of the second coolant pathway 28 is also wrinkled or corrugated along a circumferential direction thereof.

Meanwhile, the second coolant pathway 28 may be directly connected to the coolant inlet 22 and the coolant outlet 24, not through the first coolant pathway 26.

The bypass pathway 40 is inserted in the second coolant pathway 28 but is not fluidly communicating with the second coolant pathway 28. One end of the bypass pathway 40 is selectively connected to the exhaust inlet 14 through a valve 42, and the other end of the bypass pathway 40 is always connected to the exhaust outlet 16. In addition, the bypass pathway 40 is formed at a middle portion of the case 12 along a length direction thereof. So, when the exhaust gas passes through the bypass pathway 40, the exhaust gas goes straight. On the contrary, when the exhaust gas passes through the exhaust pathway 30, the exhaust gas makes a detour. Therefore, when the valve 42 is open, the exhaust gas flows in the bypass pathway 28 through the exhaust inlet 14. On the contrary, when the valve 42 is closed, the exhaust gas does not flow in the bypass pathway 28 but passes the exhaust pathway 30.

The valve 42 is selectively open or closed according to an operating condition of an engine. The valve 42 can be electrically or mechanically operated. That is, the valve 42 is electrically connected to a control portion (not shown) so as to be operated by a control signal of the control portion output according to the operating condition of the engine. In addition, the valve 42 can be operated mechanically such as by temperature of the exhaust gas.

When the engine is operated with a low speed, the valve 42 is closed. On the contrary, when the engine is operated with a high speed, for example, above a predetermined speed, the valve 42 is open. Therefore, when the engine is operated with the low speed, for example, below a predetermined speed, the exhaust gas passes through the exhaust pathway 30 and exchanges heat with the coolant. On the contrary, when the engine is operated with the high speed, the exhaust gas passes through the bypass pathway 40 and exchanges heat with the coolant.

The heat exchanger 10 according to various embodiments of the present invention may further include a connecting pipe 44 for communicating the bypass pathway 40 to the exhaust pathway 30. Therefore, the exhaust gas passing through the bypass pathway 40 flows into the exhaust pathway 30 through the connecting pipe 44. The connecting pipe 44 is radially extended from an exterior circumference of the bypass pathway 40 to the exhaust pathway 30. A plurality of the connecting pipe 44 may be formed at the bypass pathway 40 and may be evenly disposed along a circumferential direction of the bypass pathway 40.

In addition, the heat exchanger 10 according to various embodiments of the present invention may further include an air gap 50 formed between the bypass pathway 40 and the second coolant pathway 28. The air gap 50 keeps space between the bypass pathway 40 and the second coolant pathway 28 so as to prevent coolant temperature from rising extremely high by the exhaust gas of high temperature. In addition, the air gap 50 relieves thermal deformation of the bypass pathway 40.

Hereinafter, an operation of the heat exchanger 10 according to various embodiments of the present invention will be described in detail.

In a case that the engine is operated with a low speed, speed of the exhaust gas is slow and noise of the exhaust gas is small. In this case, the noise of the exhaust gas does not need to be lowered. So, the valve 42 is closed. At this time, the exhaust gas flowing in the heat exchanger 10 through the exhaust inlet 14 passes the exhaust pathway 30 and exchanges heat with the coolant in the first and second coolant pathways 26 and 28. After that, the exhaust gas flows out from the heat exchanger 10 through the exhaust outlet 16.

In a case that the engine is operated with a high speed, speed of the exhaust gas is fast and noise of the exhaust gas is significant. In this case, noise of the exhaust gas needs to be lowered. So, the valve 42 is open. At this time, the exhaust gas flowing in the heat exchanger 10 through the exhaust inlet 14 passes the bypass pathway 40 located at the middle portion of the case 12 and exchanges heat with the coolant in the second coolant pathway 28. In addition, since pressure of the bypass pathway 40 is higher than that of the exhaust pathway 30 by flow of the exhaust gas, the portion of the exhaust gas passing through the bypass pathway 40 is flowed into the exhaust pathway 30 through the connecting pipe 44. In this course, the noise of the exhaust gas is reduced through expansion and resonance of the exhaust gas. For this purpose, volume of the exhaust pathway 30 may be larger than that of the bypass pathway 40.

After that, the exhaust gas passing through the exhaust pathway 30 meets with the exhaust gas passing through the bypass pathway 40 at a downstream of the case 12. Finally, the exhaust gas flows out from the heat exchanger 10 through the exhaust outlet 16.

According to a heat exchanger of the present invention, heat-exchanging between an exhaust gas and a coolant may be promoted and noise of the exhaust gas may be reduced.

Since the heat exchanger according to various embodiments of the present invention acts as a muffler, an auxiliary muffler can be removed and components of a vehicle may be efficiently disposed under a center floor.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger comprising:
   a case provided with an exhaust inlet at one side and an exhaust outlet at another side, an exhaust gas flowing in through the exhaust inlet and flowing out through the exhaust outlet;
   a coolant pathway formed in the case and fluidly communicating with a coolant inlet and a coolant outlet so as to pass coolant therethrough;
   an exhaust pathway having a tubular shape, disposed close to the coolant pathway within the case, and provided with one end connected to the exhaust inlet and the other end connected to the exhaust outlet so as to pass the exhaust gas, wherein the exhaust gas passing through the exhaust pathway exchanges heat with the coolant passing through the coolant pathway;
   a bypass pathway having a tubular shape, disposed at a middle portion of the exhaust pathway along a length direction thereof, provided with one end selectively connected to the exhaust inlet and the other end always connected to the exhaust outlet, wherein the exhaust gas passing through the bypass pathway exchanges heat with the coolant passing through the coolant pathway; and
   a connecting pipe radially extending from an exterior circumference of the bypass pathway to the exhaust pathway so as to send a portion of the exhaust gas passing through the bypass pathway to the exhaust pathway; and
   a valve mounted at a front end portion of the bypass pathway and selectively connecting the exhaust inlet to the bypass pathway through the connecting pipe;
   wherein the exhaust gas enters the bypass pathway and flows into the exhaust pathway through the connecting pipe so as to reduce noise of the exhaust gas when the valve is open, and the exhaust gas enters the exhaust pathway directly when the valve is closed; and
   wherein the valve is closed so as for the exhaust gas to pass through the exhaust pathway when speed of the exhaust gas is lower than a predetermined speed, and the valve is open such that the exhaust gas passes through the bypass pathway and a portion of the exhaust gas is flowed into the exhaust pathway through the connecting pipe when the speed of the exhaust gas is higher than the predetermined speed.

2. The heat exchanger of claim 1, wherein the coolant pathway comprises:
   a first coolant pathway disposed between the case and the exhaust pathway causing the coolant to exchange heat with the exhaust gas passing through the exhaust pathway; and
   a second coolant pathway disposed between the exhaust pathway and the bypass pathway causing the coolant exchange heat with the exhaust gas passing through the exhaust pathway and the bypass pathway;
   wherein the first and second coolant pathways communicate with each other through a coolant connecting pipe.

3. The heat exchanger of claim 2, wherein the connecting pipe penetrates the second coolant pathway and fluidly communicates the bypass pathway with the exhaust pathway.

4. The heat exchanger of claim 2, wherein an air gap is formed between the bypass pathway and the second coolant pathway.

5. The heat exchanger of claim 2, wherein an exterior circumference of the exhaust pathway and an exterior circumference of the second coolant pathway are corrugated along a circumferential direction thereof so as to increase heat exchanging area.

6. The heat exchanger of claim 1, wherein volume of the exhaust pathway is larger than that of the bypass pathway.

7. A heat exchanger comprising:
   a case provided with an exhaust inlet at one side and an exhaust outlet at the other side, an exhaust gas flowing in through the exhaust inlet and flowing out through the exhaust outlet;
   a first coolant pathway formed along an interior circumference of the case and fluidly communicating with a coolant inlet and a coolant outlet so as to pass coolant therethrough;

an exhaust pathway having a tubular shape, inserted in the first coolant pathway, and provided with one end connected to the exhaust inlet and another end connected to the exhaust outlet so as to pass the exhaust gas therethrough;

a second coolant pathway having a tubular shape, inserted in the exhaust pathway, and fluidly communicating with the first coolant pathway so as to pass the coolant therethrough, wherein the first and second coolant pathways communicate with each other through a coolant connecting pipe;

a bypass pathway having a tubular shape, inserted in the second coolant pathway, and provided with one end selectively connected to the exhaust inlet and another end always fluidly connected to the exhaust outlet so as to selectively pass the exhaust gas therethrough;

a connecting pipe fluidly communicating the bypass pathway with the exhaust pathway; and a valve mounted at a front end portion of the bypass pathway and selectively connecting the exhaust inlet to the bypass pathway through the connecting pipe;

wherein the exhaust gas passing through the exhaust pathway exchanges heat with the coolant passing through the first and second coolant pathways;

wherein the exhaust gas passing through the bypass pathway exchanges heat with the coolant passing through the second coolant pathway;

wherein the exhaust gas enters the bypass pathway and flows into the exhaust pathway through the connecting pipe so as to reduce noise of the exhaust gas when the valve is open, and the exhaust gas enters the exhaust pathway directly when the valve is closed; and wherein the valve is closed so as for the exhaust gas to pass through the exhaust pathway when speed of the exhaust gas is lower than a predetermined speed, and the valve is open such that the exhaust gas passes through the bypass pathway and a portion of the exhaust gas is flowed into the exhaust pathway through the connecting pipe when the speed of the exhaust gas is higher than the predetermined speed.

8. The heat exchanger of claim 7, wherein the valve is open when the engine operates above a predetermined speed and the valve is closed in a case that the engine operates below a predetermined speed.

9. The heat exchanger of claim 7, wherein an air gap is formed between the bypass pathway and the second coolant pathway.

10. The heat exchanger of claim 7, wherein an exterior circumference of the exhaust pathway and an exterior circumference of the second coolant pathway are corrugated along a circumferential direction thereof so as to increase heat exchanging area.

11. The heat exchanger of claim 7, wherein volume of the exhaust pathway is larger than that of the bypass pathway.

* * * * *